3,201,422
BENZOFURANS AND PROCESS FOR PREPARING
Emil Kaiser, Flossmoor, and Elemer Domba, Chicago, Ill., assignors, by mesne assignments, to Armour Pharmaceutical Company, a corporation of Delaware
No Drawing. Filed Jan. 15, 1962, Ser. No. 166,375
19 Claims. (Cl. 260—346.2)

This is a continuation-in-part of application Serial No. 33,897, filed June 6, 1960, and now abandoned.

This invention relates to mono and bis (furan) derivatives of synthetic diphenyl estrogens, and to a method for their preparation.

It has been discovered from various studies that steroids have valuable non-endocrine activities as well as the recognized endocrine or hormonal functions. The non-endocrine functions have been suppressed by dominant endocrine functions and often are completely hidden by them. Modification of steroids has made possible clinical application of these compounds to non-endocrine fields, many of the steroid derivatives having weak hormonal activity and enhanced endocrine activity.

Synthetic estrogens, sometimes called artificial estrogens similarly have endocrine and non-endocrine activities. By modifying their structure a separation of these activities can sometimes be accomplished and derivatives having predominantly non-endocrine functions can be obtained.

We have discovered that special derivatives of synthetic estrogenic materials can be prepared. These derivatives while essentially non-estrogenic are valuable as growth promotants in the feeding of livestock and poultry. These compounds in addition are useful as intermediates in the preparation of nitrofuran compounds having utility as bactericides.

The compounds of this invention are produced from 3,3'-di(2-haloallyl) derivatives of diphenyl compounds. These compounds may be described as di-substituted derivatives of saturated and unsaturated 6 carbon chain compounds which are di-substituted by the radical

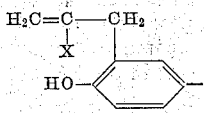

wherein X represents a halogen atom.

These haloallyl compounds have been described by one of the inventors of this present invention in U.S. application Serial No. 28,229, filed May 11, 1960. Examples of suitable starting material include 3,3'-di(2-chloroallyl)hexestrol, 3,3'-di(2-bromoallyl)hexestrol, 3,3'-di(2-iodoallyl)diethylstilbestrol, 3,3'-di(2-chloroallyl)pinacol, and the like. They are generally prepared by reacting a 2,3-di-halopropene and a diphenyl synthetic estrogen to prepare the corresponding diallyl ether which is then rearranged by a Claisen type reaction to form the 3,3'-di-(2-haloallyl) derivatives.

The process aspect of this invention comprises reacting a suitable haloallyl starting material with a hydroxide. This reaction results in a cyclic ring closure thus yielding mono and bis furan derivatives of the synthetic diphenyl estrogens.

By the process of this invention it is possible to obtain either the mono or bis furan derivatives of synthetic diphenyl estrogens. Either the mono or bis furan derivatives can be formed depending upon the solvent in which the alkaline treatment is carried out. In a less polar solvent, like N-butanol, the bis furan derivative is formed almost exclusively. In ethanol substantial amounts of the mono-furan can be obtained. In the most polar solvent, water, the mono-furan is the predominant product and only traces of the bis-furan are obtained.

One suitable method for preparing these mono and bis furans involves reacting a suitable 3,3'-di(2-haloallyl) derivative with a hydroxide which is capable of reacting with the halogen element of the starting materials. The hydroxide is typically dissolved in a polar solvent. Examples of hydroxides which may be used include sodium hydroxide, potassium hydroxide, and so on. Examples of the polar solvent are water, methanol, ethanol and N-butanol, etc. An example of this reaction, in which 3,3'-di(2-haloallyl)hexestrol is reacted with potassium hydroxide to give (1) in a less polar solvent such as N-butanol, 3,4-bis[5 - (2 - methylbenzofuranyl)]hexane or (2) with a highly polar solvent such as water or ethanol, 4-mono-[5-(2-methylbenzofuranyl)]hexane, may be illustrated by these formulae:

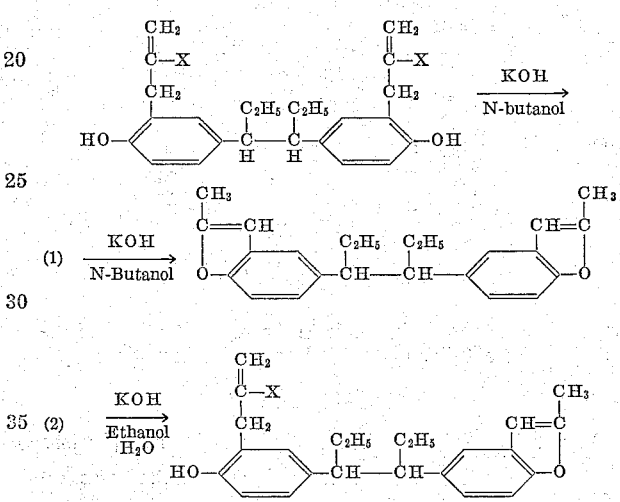

Preferably about 3 parts of hydroxide which is dissolved in a polar solvent is admixed with one part of the haloallyl compound and the mixture is refluxed until completion of the reaction. Refluxing for about 1 to 2 hours is satisfactory in most cases. We prefer to reflux under an inert atmosphere such as nitrogen gas, but this is not required.

After refluxing for a suitable time the reaction product is separated from the mixture, preferably using an organic solvent. One satisfactory separation technique includes adding water to the reaction product and solvent extracting the product, drying the extract, evaporating the solvent, and recrystallizing the product from an organic solvent.

Ether is the preferred extraction solvent. Any suitable drying agent such as sodium sulphate or calcium chloride may be used to dry the ether extract. After drying and ether removal, the product residue may be further purified by dissolving it in a solvent such as hot chloroform, charcoal treating the dissolved residue and recrystallizing it from an organic solvent such as an alcohol, chloroform or an acetic acid. Other suitable purification procedures may be used.

By this procedure (1) 3,4-bis[5-(2-methylbenzofuranyl)]hexane-3,4-diol or (2) 3,[3(2-haloalkenyl)-4-hydroxyphenyl] - 4 - [5(2-methylbenzofuranyl)]hexane-3,4-diol may be prepared from a 3,3'-di(2-haloallyl) pinacol according to the following equations:

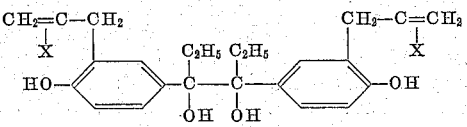

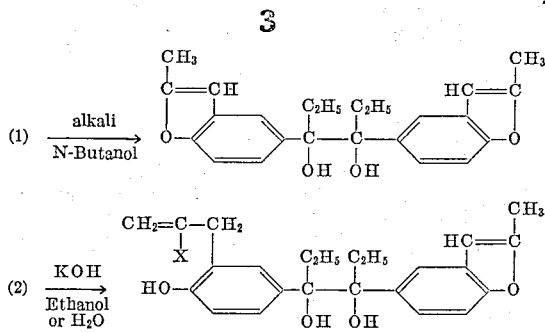

Similarly bicyclic ring closure can be effected in 6 carbon chain compounds to produce for example, (1) 3,4-bis[5-(2-methylbenzofuranyl)]-3,4-trans-hexene or (2) 3[3(2 - haloalkenyl) - 4-hydroxyphenyl]-4-[5-(2-methylbenzofuranyl)]-3,4-trans-hexene from 3,3′-di(2-haloallyl) diethylstilbestrol, the aforesaid products having the following structures:

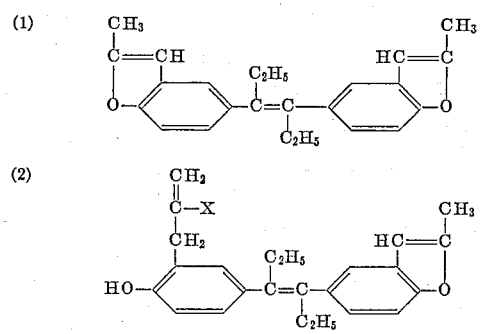

Reference should be made to the following detailed examples for a fuller understanding of this invention.

EXAMPLE I

*Preparation of 3,4-bis[5-(2-methylbenzofuranyl)]hexane*

1.5 grams of 3,3′-di(2-chloroallyl) hexestrol was refluxed with 25 ml. of N-butanol in which 5 grams of potassium hydroxide were dissolved. After 2 hours of refluxing, the mixture was allowed to stand overnight in room temperature. A crystallized precipitate was formed which was difficult to filter. The precipitate was washed with N-butanol and then with water. After drying a yield of 1.15 grams of crystals were obtained. The melting point of the bis-furan derivatives of hexestrol was 201°–202° C.

Structural proof for these compounds was furnished by infrared and ultraviolet absorption spectra studies. The absence of hydroxyl groups was evident from the I.R. absorption spectra. In the ultraviolet absorption spectra there were found absorption maxima of about 280 and 288 millimicrons, indicating the presence of double bonds conjugated with the aromatic rings. Bromine was taken up by the derivatives in chloroform, showing the presence of double bonds. The reaction products were halogen free. Elemental analysis of the compound provided the following values:

Calculated for $C_{24}H_{26}O_2$: C, 83.19%; H, 7.57%. Found: C, 83.02%; H, 7.73%.

EXAMPLE II

*Preparation of 3,4-bis-[5-(2-methylbenzofuranyl)]-3,4-trans-hexene*

1.5 grams of 3,3′-di(2-chloroallyl) diethylstilbestrol was refluxed with 25 ml. of N-butanol in which contained 5 grams of potassium hydroxide. After refluxing and recovery as described in Example I a derivative having a M.P. of 183°–185° C. was recovered.

*Analysis.*—Calculated for $C_{26}H_{24}O_2$: C, 83.68%; H, 7.03%. Found: C, 83.44%; H, 7.13%.

EXAMPLE III

*Preparation of 3-[3(2-chloroalkenyl)-4-benzoyloxyphenyl]-4-[5(2-methylbenzofuranyl)] hexane*

10 grams of potassium hydroxide was dissolved in 50 ml. of water and 3 g. of 3,3′-di(2-chloroallyl) hexestrol was added. The mixture was refluxed overnight and then chilled. A flocculent precipitate was formed which was difficult to filter. When the precipitate was washed with water, it was transformed into a tacky substance. This was dried in vacuo and suspended in glacial acetic acid. Most of the tacky substance dissolved and only a small amount remained insoluble. This insoluble material was crystallized from acetic acid and was shown to be identical with the bis-furan derivatives of hexestrol, M.P. 201° C.–202° C. The acetic acid mother liquor was diluted with water and to the resulting suspension diluted hydrochloric acid was added. An oily substance separated. The mixture was extracted with ether and the solvent evaporated. The waxy residue of the ether extract showed I.R. absorption at 3.2 microns, indicating the presence of hydroxyl groups. In the U.V. absorption curves, peaks were observed at 282 and 289 millimicrons. The shape of the U.V. absorption curve was very similar to that of the di-furan derivatives of hexestrol. The waxy substance was then mixed with a 20% aqueous potassium hydroxide solution, Skelly B and a few drops of benzoylchloride were added. On stirring, the suspended material dissolved in the solvent. The Skelly B layer was separated, washed with water and concentrated in vacuo. When crystallization was started, the vacuum was disconnected and the solution chilled. White crystals, separated, were collected on a filter and dried, M.P. 136°–139° C.

*Analysis.*—Calculated for $C_{31}H_{31}ClO_3$: C, 76.5; H, 6.43; Cl, 7.3. Found: C, 76.44; H, 6.65; Cl, 7.27.

This analysis indicated the structure:

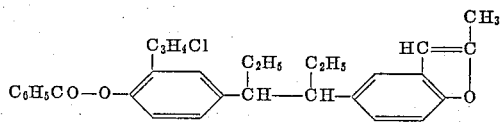

The infrared absorption spectrum showed carbonyl absorption at 5.76 microns. At 6.15 microns an absorption peak shorter than a peak at 6.15 microns was found. The length of the peaks at 6.15 and 6.25 microns was in reversed order compared to the length of the peaks at the same wave length in the 3,3′-diallyl compounds.

EXAMPLE IV

The product obtained in Example III can also be obtained by the following method:

3 grams of 3,3′-di(2-chloroallyl) hexestrol (0.007 mole) was added to a solution of 10 g. (0.19) mole of potassium hydroxide in 50 ml. of water. After 8 hours of refluxing, the mixture was cooled to room temperature and 100 ml. of Skelly B and 5.6 g. of benzoylchloride (0.0397 mole) were added. After half an hour of stirring, the precipitate formed on cooling, dissolved in the solvent. The organic layer was separated, washed several times with water and the solvent evaporated. The gummy residue solidified on the addition of methanol and was recrystallized from 50 ml. of Skelly B, M.P. 134–139° C.

*Analysis.*—Calculated for $C_{31}H_{31}ClO_3$: C, 76.5; H, 6.43; Cl, 7.3. Found: C, 76.87; H, 6.73; Cl, 7.17.

EXAMPLE V

*Preparation of 3-[3(2-chloroalkenyl)-4-benzoyloxyphenyl]-4-[5(2-methylbenzofuranyl)]-trans-hexene-3,4*

3,3′-di(2-chloroallyl)-diethylstilbestrol (8.34 g.) (0.02 mole), was refluxed with 20 g. of potassium hydroxide and 100 ml. of water. The reaction mixture was then treated with benzochloride in the same manner as described in Example IV. It was obtained in crystalline form, M.P. 96°–97° C.

*Analysis.*—Calculated for $C_{31}H_{29}ClO_3$: C, 77.1; H, 6.0; Cl, 7.34. Found: C, 76.41; H, 6.13; Cl, 7.77.

EXAMPLE VI

*Preparation of 3-[3(2-bromoalkenyl)-4-benzoyloxyphenyl]-4-[2-methylbenzofuranyl] hexane*

5.4 g. of hexestrol, 5.6 g. of anhydrous potassium carbonate and 8.8 ml. of 2,3-dibromopropene were refluxed with 50 ml. of 2-butanone after 8 hours of refluxing, water was added and the mixture extracted with ether. The ether extract was washed with a 2% potassium hydroxide solution, then with water and then dried over sodium sulfate. The ether extract was evaporated and the residue dissolved in 1000 ml. of boiling methanol. The solution was chilled and the crystals formed on cooling were separated. The product dissolved in hot acetone, water was added until cloudiness developed. After 24 hours in the refrigerator, the crystalline di(2-bromoallyl) ether of hexestrol was collected on a filter and dried, M.P. 104°–106° C.

6.4 g. of the di(2-bromoallyl) ether of hexestrol was refluxed with 64 ml. of diethylaniline in an atmosphere of nitrogen. After 6 hours of refluxing under nitrogen the mixture was cooled, hydrochloric acid was added. The mixture was extracted with ether. The ether extract was washed with water and dried over sodium sulfate and the solvent was evaporated. The residue dissolved in methanol. A precipitate was formed when 10% aqueous potassium hydroxide solution was added. Product was collected on a filter and washed with 10% aqueous potassium hydroxide solution. The combined filtrates contained the 3,3'-di(2-bromoallyl) hexestrol. The precipitate was suspended in a 5% aqueous potassium hydroxide solution and benzoyl chloride and Skelly B were added. On stirring at room temperature, the solid dissolved in the Skelly B layer. The organic layer was separated and the solvent evaporated. The residue was crystallized from ethanol 1.5 g. of impure benzoyl ester, M.P. 124°–127° C. was obtained.

200 mg. of this impure benzoate was dissolved in 10 ml. of ether and 20 ml. of Skelly B was added. The solution was passed through a column of 20 g. of neutral alumina Woelm. The column was washed with a mixture of ether-Skelly 1:2 and then the compound eluted with a 1:1 ether-petroleum ether mixture. The solvents were evaporated in vacuo and the residue crystallized from ethanol. It had a melting point of 130°–131° C.

*Analysis.*—Calculated for $C_{31}H_{31}BrO_3$: C, 70.1; H, 5.84; Br, 15.03. Found: C, 69.94; H, 5.94; Br, 15.18.

EXAMPLE VII

The product obtained in Example V can also be obtained by the following method.

3,3'-di(2 - bromoallyl) - diethylstilbestrol was treated with aqueous alkali and then with benzoyl chloride in the manner described for the 3,3'-di(2-chloroallyl) hexestrol in Example IV. The mono-benzoate of the monofuran derivative of diethylstilbestrol was obtained in crystalline form.

While in the foregoing specification certain embodiments of our invention were described in considerable detail, it will be obvious to those skilled in the art that various modifications may be resorted to without departing from the spirit or scope of our invention.

We claim:

1. A compound selected from the class consisting of hexane, hexene, hexadiene derivatives, said compound having the structure:

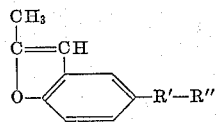

wherein R' is selected from the group consisting of;

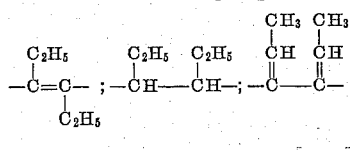

and

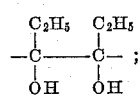

and R'' is selected from the group consisting of

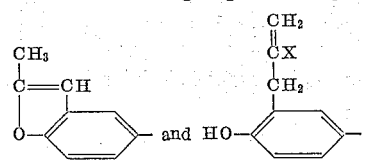

wherein X is selected from the group consisting of chlorine, bromine and iodine.

2. 3,4-bis[5-(2-methylbenzofuranyl)]-hexane.

3. 3,4-bis[5-(2-methylbenzofuranyl)] - 3,4 - hexene, wherein the hexene portion of the molecule has the trans configuration:

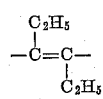

4. 3,4-bis[5-(2-methylbenzofuranyl)]-hexane-3,4-diol.

5. 3[3 - (2 - haloalkenyl) - 4 - hydroxyphenyl] - 4-[5(2-methylbenzofuranyl)]-hexane wherein said halogen is selected from the group consisting of bromine, chlorine and iodine and said alkenyl contains not more than 8 carbon atoms.

6. 3[3 - (2 - haloalkenyl) - 4 - hydroxyphenyl] - 4-[5(2-methylbenzofuranyl)]-3,4-trans hexene wherein said halogen is selected from the group consisting of bromine, chlorine and iodine and said alkenyl contains not more than 8 carbon atoms.

7. 3[3 - (2 - haloalkenyl) - 4 - hydroxyphenyl] - 4 [5(2-methylbenzofuranyl)]-hexane-3,4-diol wherein said halogen is selected from the group consisting of bromine, chlorine and iodine and said alkenyl contains not more than 8 carbon atoms.

8. The process of claim 17 wherein 3,3'-di-(2-haloallyl) hexestrol is reacted.

9. The process of claim 17 wherein 3,3'-di(2-haloallyl) diethylstilbestrol is reacted.

10. The process of claim 17 wherein 3,3'-di(2-haloallyl) pinacol is reacted.

11. The process of preparing furan derivatives according to claim 18 comprising the steps of mixing alkali metal hydroxide into a polar solvent, said solvent being chemically unreactive with the components of the mixture, admixing a 3,3' di(2-bromoallyl) hexestrol with said metal hydroxide, refluxing the admixed compounds to thereby form a furan reaction product, solvent extracting said product in the presence of water, removing water from said product and crystallizing said product from an inert organic solvent.

12. The process of preparing furan derivatives according to claim 18 comprising the steps of mixing a metal hydroxide into a polar solvent, said solvent being chemically unreactive with the components of the mixture, admixing 3,3'-di(2-bromoallyl) diethylstilbestrol with said metal hydroxide, refluxing the admixed compounds to thereby form a furan reaction product, adding water to said product removing water from said product, and crystallizing said product from an inert organic solvent.

13. The process of preparing furan derivatives according to claim 18 comprising the steps of mixing a metal hydroxide into a polar solvent, said solvent being chemically unreactive with the components of the mixture, admixing 3,3'-di(2-chloroallyl) diethylstilbestrol with said metal hydroxide, refluxing the admixed compounds to therby form a furan reaction product, adding water to the product and solvent extracting said product, removing water from the product, and crystallizing said product from an inert organic solvent.

14. 3,4-bis[5-(2-methylbenzofuranyl)]-2,4-hexadiene.

15. 3[3 - (2 - haloalkenyl) - 4 - hydroxyphenyl] - 4-[5-(2-methylbenzofuranyl)]-2,4 - hexadiene wherein the halogen is selected from the group consisting of bromine, chlorine and iodine, and said alkenyl contains not more than 8 carbon atoms.

16. The process of preparing a furan derivative of compound selected from the group consisting of: 3,4-bis[4-hydroxyphenyl]-hexane; 3,4-bis[4-hydroxyphenyl] - 3 - hexene; 3,4-bis[4-hydroxyphenyl]-2,4-hexadiene; and 3,4-bis[4-hydroxyphenyl] hexane-3,4-diol, said derivative having the structure

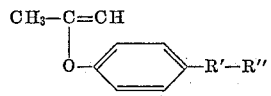

wherein R' is selected from the group consisting of

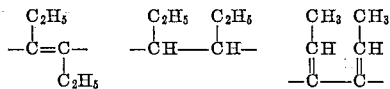

and

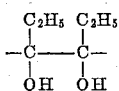

and R" is selected from the group consisting of:

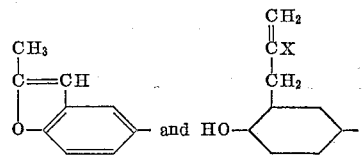

wherein X is selected from the group consisting of chlorine, bromine and iodine, comprising the steps of reacting an alkali metal hydroxide with a compound selected from the group consisting of: 3,4-bis[3-(2-haloallyl)-4-hydroxyphenyl]-hexane; 3,4-bis[3-(2-haloallyl)-4-hydroxyphenyl] - 3 - hexene; 3,4 - bis[3-(2-haloallyl)-4-hydroxyphenyl]-2,4-hexadiene; and 3,4-bis[3-(2-haloallyl)-4-hydroxyphenyl]-hexane-3,4-diol, to thereby form a furan reaction product; and extracting said reaction product, said reaction product being said furan derivative.

17. The process of preparing furan derivatives of a compound selected from the group consisting of: 3,4-bis-[4-hydroxyphenyl]-hexane; 3,4 - bis[4-hydroxyphenyl]-3-hexene; 3,4-bis[4-hydroxyphenyl]-2,4-hexadiene; and 3,4-bis[4-hydroxyphenyl]-hexane - 3,4 - diol comprising the steps of refluxing with an alkali metal hydroxide a compound selected from the group consisting of: 3,4-bis[3-(2-haloallyl)-4-hydroxyphenyl] - hexane; 3,4 - bis[3 - (2-haloallyl)-4-hydroxyphenyl]-3-hexene; 3,4-bis[3-(2-haloallyl)-4-hydroxyphenyl]-2,4-hexadiene; and 3,4-bis[3-(2-haloallyl)-4-hydroxyphenyl]-hexane-3,4-diol in which said halogen is selected from the group consisting of chlorine, bromine and iodine, to thereby form a furan reaction product, extracting said product with an organic solvent, substantially drying said product, and crystallizing said product from an inert organic solvent.

18. The process of preparing furan derivatives of a compound selected from the group consisting of: 3,4-bis-[4-hydroxyphenyl]-hexane; 3,4-bis[4-hydroxyphenyl]-3-hexene; and 3,4-bis[4-hydroxyphenyl]-2,4-hexadiene; 3,4-bis[4-hydroxyphenyl]-hexane-3,4-diol comprising the steps of mixing an alkali metal hydroxide into a polar solvent, said solvent being chemically unreactive with the components of the mixture, admixing a compound selected from the group consisting of: 3,4-bis[3-(2-haloallyl)-4-hydroxyphenyl]-hexane; 3,4-bis[3 - (2 - haloallyl) - 4 - hydroxyphenyl]-3-hexene; 3,4-bis[3-(2 - haloallyl) - 4 - hydroxyphenyl]-2,4-hexadiene; and 3,4 - bis[3 - (2-haloallyl)-4-hydroxyphenyl]-hexane-3,4-diol with said alkali metal hydroxide, refluxing the admixed compounds to thereby form a furan reaction product, adding water to said product and solvent extracting said product, drying said product, removing solvent from said product, and crystallizing said product from an inert organic solvent.

19. The process of preparing furan derivatives according to claim 18 comprising the steps of mixing an alkali metal hydroxide into a polar solvent, said solvent being chemically unreactive with the components of the mixture, admixing a 3,3'-di(2-chloroallyl) hexestrol with said alkali metal hydroxide, refluxing the admixed compounds to thereby form a furan reaction product, solvent extracting said product in the presence of water, drying said product, and crystallizing said product from an inert organic solvent.

No references cited.

NICHOLAS S. RIZZO, *Primary Examiner.*

DUVAL T. McCUTCHEN, *Examiner.*